UNITED STATES PATENT OFFICE.

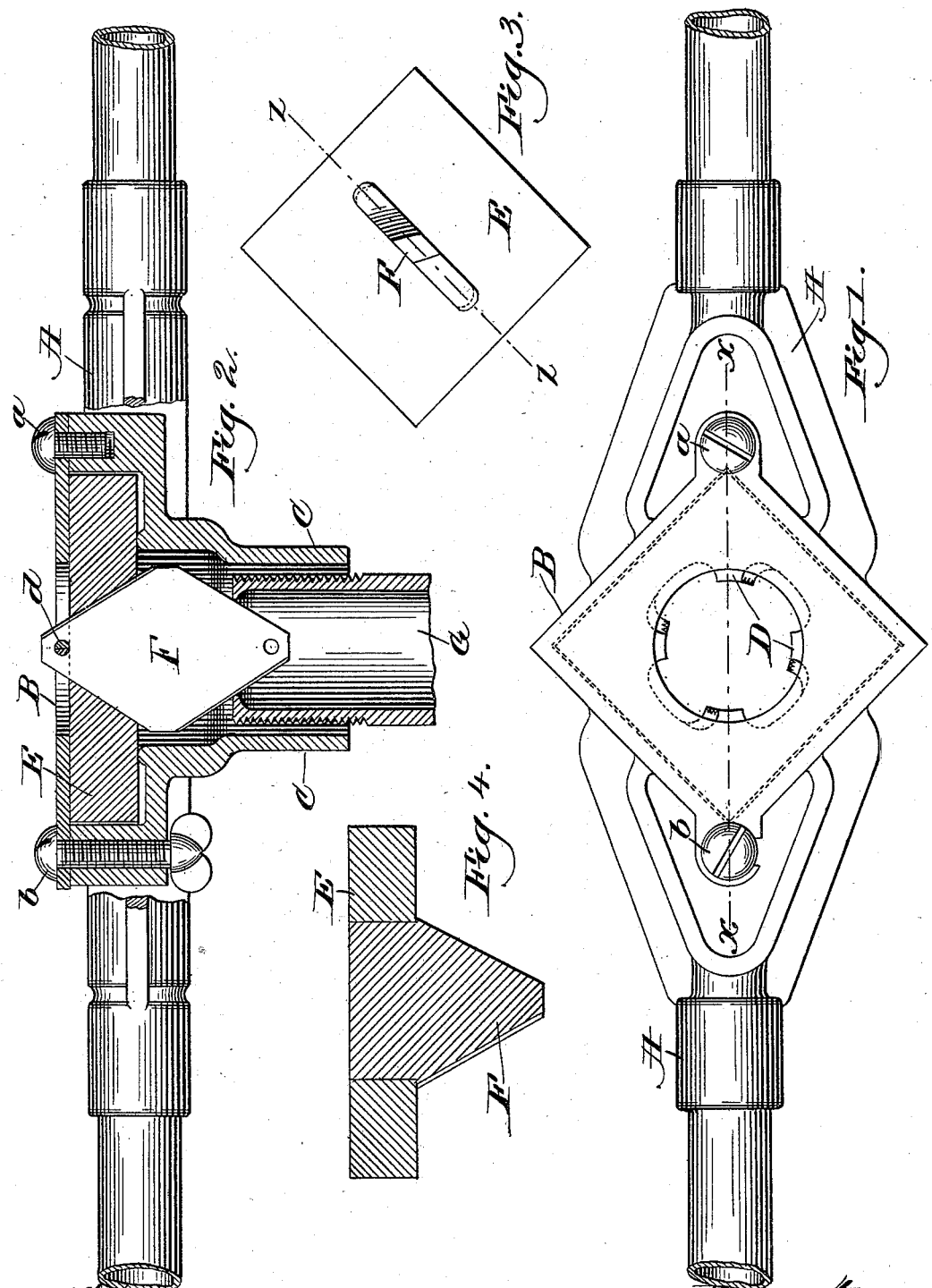

OSBORN B. HALL, OF MALDEN, MASSACHUSETTS.

PIPE-REAMER.

SPECIFICATION forming part of Letters Patent No. 554,420, dated February 11, 1896.

Application filed December 20, 1895. Serial No. 572,729. (No model.)

*To all whom it may concern:*

Be it known that I, OSBORN B. HALL, of Malden, in the county of Middlesex and State of Massachusetts, have invented a new and useful Improvement in Pipe-Reamers, which will, in connection with the accompanying drawings, be hereinafter fully described, and specifically defined in the appended claims.

In said drawings, Figure 1 is a top plan view of the central portion of a die-plate in which my invention is used, a thread-cutting die being shown in said plate. Fig. 2 is a central vertical section on line X X, Fig. 1, but showing the pipe-reamer in place of the threading-die. Fig. 3 is an under side plan view of my newly-invented reamer; and Fig. 4 is a vertical section on line Z Z, Fig. 3, but showing a modification of the reamer shown in Fig. 2.

The object of this invention is to provide a tube-reamer that is in small compass, so that it can be readily packed and carried in tool-chests, that is fitted to the die-plate so as to be thereby manipulated when reaming pipes, and that can be put into and out of use almost instantly as desired; and the invention with the combinations thereof will be next herein described and then pointed out in the claims.

This invention is more especially for the use of workmen when employed in piping buildings and similar jobs, where the pipe is subject to be severed by hand to proper lengths and when at each such cut the fresh-made ends must be threaded by hand; and as such severance of the pipe is now generally effected by means of a smooth-edged rotating cutter the pipe is at the point of severance carried inward and thereby materially reduced in its internal diameter, and as the capacity of any pipe is the point of its least diameter, therefore in a majority of cases such cutting or severance of pipes is at an actual loss of at least twenty-five per cent. of their conducting capacity. To remedy this defect and to furnish a quickly-operated and perfectly-effective reamer, I employ the well-known die-plate A, which is formed with a recess to receive the well-known solid thread-cutting die D, which is locked in place by the cap B, which is pivoted upon screw $a$, and which swings into contact with the locking-screw $b$, as shown in Fig. 1.

The tube G to be threaded is secured horizontally, and the die-plate A, holding die D, is then applied thereto for the purpose of threading the end, and when this is accomplished screw $b$ is slackened, cap B is swung out of the way, die D is removed, and die E is inserted and secured in its stead with the cutting-reamer F extending into the pipe, as shown in Fig. 2, when the workmen by again rotating die-plate A cut out the bur that was caused by severing the pipe by means of a smooth-edged rotary cutter. During these operations the sleeve C incloses the pipe, and if the pipe is of less diameter than said sleeve then a bushing is inserted therein.

The cutting-blade F of the reamer can be inserted in its die E, as shown in Fig. 2, and secured in place by pin $d$, and so shaped as to reverse ends when one end becomes dull by use, and I prefer the method of construction shown in Fig. 2, which is reversible.

It will be obvious that but a moment is requisite to slacken screw $b$ and swing cap B out of the way, when die D is removed and the die D carrying reamer F is inserted in its place, while the plate remains upon the pipe.

The cutting-reamer F will fit all sizes of pipe from the size of pipe C downward to the smallest, and it is sharpened by grinding it upon its flat sides, and when worn out another cutter is inserted in the die for use.

It will be apparent at a glance that my reamer F must be secured in a holding-die E, that is adapted to be inserted in the die-stock in the same manner as is the thread-cutting die D, and it is secured in place by the cap B in the same manner as is said die D, and so that either can be substituted for the other, as desired.

Having thus described my invention, what I claim as new, and desire to secure by Letters Patent, is—

1. In combination with die-plate A formed to receive the threading-die D and to lock and release the same, a pipe-reamer, formed with a body E to fit in the cavity that holds die D, and with a reaming-cutter F inserted in body E and adapted to cut away the bur formed in the pipe adjacent to its orifice, substantially as specified.

2. A pipe-reamer formed with a broadened and flattened die or holder E adapted to be secured in a die-plate and a flattened tapered cutter F inserted and secured in said die, substantially as specified.

3. A pipe-reamer formed with a broadened and flattened die or holder E, and a cutter F tapered from near its center to each end and provided with a pin $d$ to secure it in said die, whereby said cutter can be reversed for use at either end, as desired and for the purpose specified.

OSBORN B. HALL.

Witnesses:
T. W. PORTER,
WM. W. BURRAGE.